(12) United States Patent
Shepard et al.

(10) Patent No.: US 8,778,243 B2
(45) Date of Patent: *Jul. 15, 2014

(54) COMPOSITE HOOK AND LOOP FASTENERS, METHODS OF THEIR MANUFACTURE, AND PRODUCTS CONTAINING THEM

(75) Inventors: William H. Shepard, Amherst, NH (US); William P. Clune, Concord, NH (US)

(73) Assignee: Velcro Industries B.V., Willemstad, Curacao (NL)

( * ) Notice: Subject to any disclaimer, the term of this patent is extended or adjusted under 35 U.S.C. 154(b) by 58 days.

This patent is subject to a terminal disclaimer.

(21) Appl. No.: 10/271,494

(22) Filed: Oct. 15, 2002

(65) Prior Publication Data

US 2003/0074768 A1    Apr. 24, 2003

Related U.S. Application Data

(60) Continuation of application No. 09/818,197, filed on Mar. 26, 2001, now Pat. No. 6,481,063, which is a division of application No. 09/187,936, filed on Nov. 6, 1998, now Pat. No. 6,205,623.

(51) Int. Cl.
*A44B 18/00* (2006.01)

(52) U.S. Cl.
USPC ........... 264/146; 264/149; 264/160; 264/167; 24/446; 24/450

(58) Field of Classification Search
USPC ....... 264/167, 146, 149, 160, 248; 24/30.5 R, 24/306, 30.5 P, 450, 452, 446, 448; 128/DIG. 15; 428/100; 383/71, 75
See application file for complete search history.

(56) References Cited

U.S. PATENT DOCUMENTS

| 3,000,386 A | 9/1961 | Piere, Jr. .................. 132/46 |
| 3,147,528 A | 9/1964 | Erb |

(Continued)

FOREIGN PATENT DOCUMENTS

| DE | 197 03 193 | 10/2000 |
| EP | 0 580 073 | 1/1994 |

(Continued)

OTHER PUBLICATIONS

Velcro Brand Fastening Systems, Sewing Guide, company publication, Velcro USA, Inc., 1989.

(Continued)

*Primary Examiner* — Jack W. Lavinder
(74) *Attorney, Agent, or Firm* — Fish & Richardson P.C.

(57) ABSTRACT

A composite hook and loop fastener in the form of an elongated strip has an elongated loop component, a hook component permanently affixed to the loop component, and a backing layer disposed on a face of the wrap tie in a discrete region. The backing layer is used for permanent attachment of the wrap tie to a supporting surface. One end of the loop component is available for encircling an object to be wrapped and engaging the fastener elements of the hook component. The loop component has a self-supporting web of entangled fibers, the fibers forming both a sheet-form body and hook-engageable, free-standing loops extending from at least one surface of the body, and the hook component has fastener elements extending from a common base. The backing layer may be a pressure sensitive adhesive or a synthetic resin.

21 Claims, 14 Drawing Sheets

(56) References Cited

U.S. PATENT DOCUMENTS

| | | | |
|---|---|---|---|
| 3,312,583 A | 4/1967 | Rochlis | |
| 3,322,325 A | 5/1967 | Bush | 229/62 |
| 3,426,363 A * | 2/1969 | Girard | 2/338 |
| 3,594,863 A | 7/1971 | Erb | |
| 3,594,865 A | 7/1971 | Erb | |
| 3,752,619 A | 8/1973 | Menzin | |
| 3,758,657 A | 9/1973 | Menzin et al. | |
| 3,762,000 A | 10/1973 | Menzin et al. | |
| 3,814,052 A | 6/1974 | Caratsch | |
| 3,991,708 A | 11/1976 | Huebschmann et al. | |
| 4,074,397 A | 2/1978 | Rosin | 24/73 |
| 4,088,136 A | 5/1978 | Hasslinger et al. | 128/349 R |
| 4,097,634 A | 6/1978 | Bergh | 428/156 |
| 4,149,540 A | 4/1979 | Hasslinger | 128/327 |
| 4,247,967 A | 2/1981 | Swinton | 26/143 R |
| 4,343,260 A | 8/1982 | Yajima et al. | |
| 4,465,486 A | 8/1984 | Hill | 604/337 |
| 4,569,348 A | 2/1986 | Hasslinger | 604/179 |
| 4,592,118 A * | 6/1986 | DeWoskin | 24/444 |
| 4,615,084 A | 10/1986 | Erb | |
| 4,672,722 A | 6/1987 | Malamed | 24/446 |
| 4,706,914 A * | 11/1987 | Ground | 248/74.3 |
| 4,732,800 A | 3/1988 | Groshens | |
| 4,761,318 A | 8/1988 | Ott et al. | 428/85 |
| 4,794,028 A | 12/1988 | Fischer | 428/100 |
| 4,815,172 A | 3/1989 | Ward | 24/16 R |
| 4,854,735 A | 8/1989 | Rutledge | 383/72 |
| 4,894,060 A | 1/1990 | Nestegard | |
| 4,906,108 A | 3/1990 | Herrington et al. | 303/71 |
| 4,913,560 A | 4/1990 | Herrington | 383/71 |
| 4,931,344 A | 6/1990 | Ogawa et al. | |
| 4,933,224 A | 6/1990 | Hatch | 428/100 |
| 4,939,818 A | 7/1990 | Hahn | 24/16 R |
| 4,955,981 A | 9/1990 | Provost | 383/86 |
| 4,986,265 A | 1/1991 | Caponi | 128/82 |
| 4,999,067 A | 3/1991 | Erb et al. | 156/73.1 |
| 5,015,251 A | 5/1991 | Cherubini | |
| 5,048,158 A | 9/1991 | Koerner | 24/16 R |
| 5,133,112 A | 7/1992 | Gomez-Acevedo | |
| 5,142,743 A | 9/1992 | Hahn | 26/16 R |
| 5,168,603 A | 12/1992 | Reed | 24/16 R |
| 5,172,980 A | 12/1992 | Provost | 383/204 |
| 5,180,534 A | 1/1993 | Thomas et al. | |
| 5,200,245 A | 4/1993 | Brodrick, Jr. | 428/100 |
| 5,230,851 A | 7/1993 | Thomas | |
| 5,231,738 A | 8/1993 | Higashinaka | 24/446 |
| 5,260,015 A * | 11/1993 | Kennedy et al. | 264/167 |
| 5,286,111 A | 2/1994 | Brembilla | 383/62 |
| 5,293,884 A | 3/1994 | Chapman et al. | 132/200 |
| 5,300,058 A | 4/1994 | Goulait et al. | |
| 5,321,855 A | 6/1994 | Ciuffo | 2/239 |
| 5,326,415 A | 7/1994 | Thomas | |
| 5,386,595 A | 2/1995 | Kuen et al. | |
| 5,403,413 A * | 4/1995 | Masuda | 156/66 |
| 5,441,687 A | 8/1995 | Murasaki et al. | 264/167 |
| 5,452,877 A | 9/1995 | Riffle et al. | 248/511 |
| 5,505,747 A | 4/1996 | Chesley et al. | |
| 5,518,795 A | 5/1996 | Kennedy et al. | |
| 5,554,239 A | 9/1996 | Datta et al. | |
| 5,569,348 A | 10/1996 | Hefele | |
| 5,586,371 A | 12/1996 | Thomas | |
| 5,595,014 A | 1/1997 | Moore | 43/25 |
| 5,595,567 A | 1/1997 | King et al. | |
| 5,604,961 A | 2/1997 | Cole | 24/306 |
| 5,606,781 A | 3/1997 | Provost et al. | |
| 5,614,057 A | 3/1997 | Conley, Jr. et al. | 156/354 |
| 5,620,769 A | 4/1997 | Wessels et al. | 428/100 |
| 5,624,429 A | 4/1997 | Long et al. | 604/391 |
| 5,636,414 A | 6/1997 | Litchholt | 34/304 |
| 5,636,503 A | 6/1997 | Kaspszyk | |
| 5,643,651 A | 7/1997 | Murasaki | |
| 5,669,120 A * | 9/1997 | Wessels et al. | 24/446 |
| 5,672,404 A | 9/1997 | Callahan, Jr. et al. | 428/100 |
| 5,744,080 A | 4/1998 | Kennedy et al. | |
| 5,762,645 A | 6/1998 | Peck et al. | |
| 5,786,062 A | 7/1998 | Callahan, Jr. et al. | 428/100 |
| 5,851,467 A * | 12/1998 | Murasaki | 264/167 |
| 5,868,844 A | 2/1999 | Kato et al. | |
| 5,908,680 A | 6/1999 | Moren et al. | |
| 5,957,908 A | 9/1999 | Kline et al. | |
| 5,989,204 A | 11/1999 | Lina | |
| 5,997,522 A | 12/1999 | Provost et al. | |
| 6,000,106 A | 12/1999 | Kampfer et al. | |
| 6,051,094 A | 4/2000 | Melbye et al. | |
| 6,060,009 A | 5/2000 | Welygan | |
| 6,080,347 A | 6/2000 | Goulait | |
| 6,106,922 A | 8/2000 | Cejka et al. | |
| 6,115,891 A | 9/2000 | Suenaga et al. | |
| 6,205,623 B1 * | 3/2001 | Shepard et al. | |
| 6,248,419 B1 | 6/2001 | Kennedy et al. | |
| 6,406,467 B1 | 6/2002 | Dilnik et al. | |
| 6,463,635 B2 | 10/2002 | Murasaki | |
| 6,481,063 B2 * | 11/2002 | Shepard et al. | 24/30.5 R |
| 6,489,003 B1 | 12/2002 | Levitt et al. | |
| 2001/0016245 A1 | 8/2001 | Tuman et al. | |
| 2001/0018110 A1 | 8/2001 | Tuman | |
| 2002/0022108 A1 | 2/2002 | Krantz et al. | |

FOREIGN PATENT DOCUMENTS

| | | |
|---|---|---|
| FR | 2 750 319 | 1/1998 |
| JP | 56-87172 | 12/1979 |
| JP | 63-35110 | 2/1988 |
| JP | 20-83058 | 3/1990 |
| JP | 06-509727 | 6/1994 |
| JP | 07-100006 | 4/1995 |
| JP | 08-299032 | 8/1996 |
| JP | 9-000315 | 1/1997 |
| JP | 10-117815 | 5/1998 |
| JP | 10-137008 | 5/1998 |
| JP | 10-137008 A * | 5/1998 |
| WO | WO 96/03101 | 2/1996 |
| WO | WO 97/25892 | 7/1997 |
| WO | WO 99/17630 | 4/1999 |
| WO | WO 99/17631 | 4/1999 |
| WO | WO 00/07532 | 2/2000 |
| WO | WO 00/50229 | 8/2000 |

OTHER PUBLICATIONS

Translation of Japanese Office Action for corresponding Japanese Application No. 2000/580481 Dated Oct. 22, 2009.
European Search Report for corresponding European Patent Application No. 09172111.8 Dated Nov. 13, 2009.
International Preliminary Examination Report dated Jun. 19, 2003 for International Application No. PCT/US2002/28205 (6 pages).
Reply to Communication of Notice of Opposition dated Mar. 15, 2011, Mailed Oct. 18, 2011 on behalf of 3M Innovative Properties Company re European Patent No. EP 1 444 079 (12 pp).
Notice of Opposition dated Mar. 7, 2011 on behalf of Velcro, Inc. re European Patent No. 1 444 079 (39 pp).
International Search Report for PCT Publication No. WO03/039833 (International Application No. PCT/US02/28205) mailed Nov. 25, 2002 (2 pp).
Reply to an examination report in opposition proceedings in Opposition against EP 1 165 313 dated Feb. 2, 2011 (3 pp).
Communication inviting the parties to file observations in Opposition against EP 1 165 313 dated Dec. 14, 2010 (19 pp).
Communication inviting the parties to file observations in Opposition against EP 1 165 313 dated May 3, 2010 (5 pp).
Reply from the opponent to submission of proprietor in Opposition against EP 1 165 313 dated Apr. 23, 2010 (4 pp).
Provision of the minutes in accordance with Rule 124(4) EPC in Opposition against EP 1 165 313 dated Dec. 9, 2009 (7 pp).
Letter to EPO forwarding requests and arguments in Opposition against EP 1 165 313 dated Aug. 21, 2009 (53 pp).
Reply from the opponents to submission of proprietor in Opposition against EP 1 163 313 dated Dec. 20, 2006 (17 pp).
Notice of Opposition against EP 1 163 313 dated Sep. 15, 2005 (24 pp).

(56) References Cited

OTHER PUBLICATIONS

Masato Takatsuji, "Translation of Notice of Reasons for Rejections", JP Patent Application No. 2000-580481, issued on May 17, 2012 (7 pages).

Takashi Kameda, "Translation of Inquiry", JP Patent Application No. 2000-580481, issued on Aug. 23, 2011 (7 pages).

"Translation of Decision of Rejection", JP Patent Application No. 2000-580481, issued on Jul. 2, 2010 (3 pages).

* cited by examiner

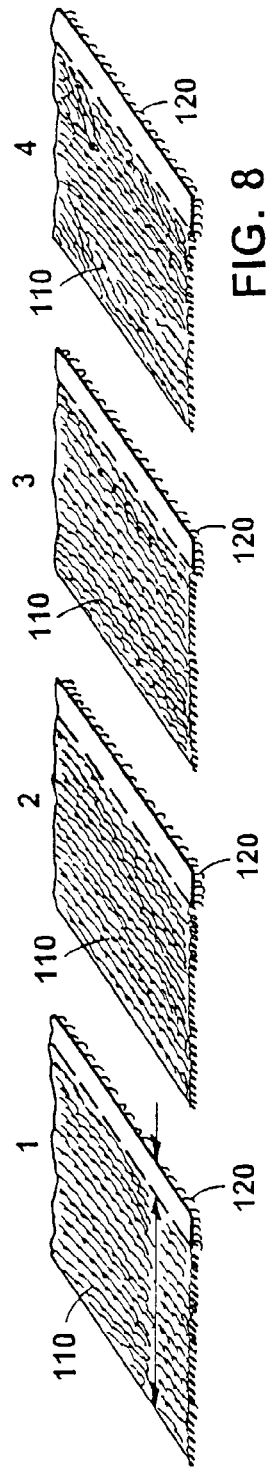
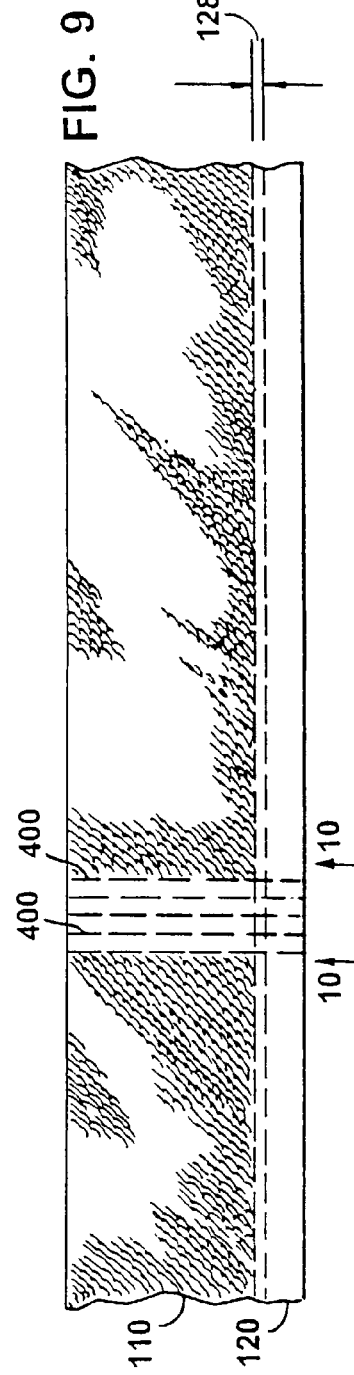
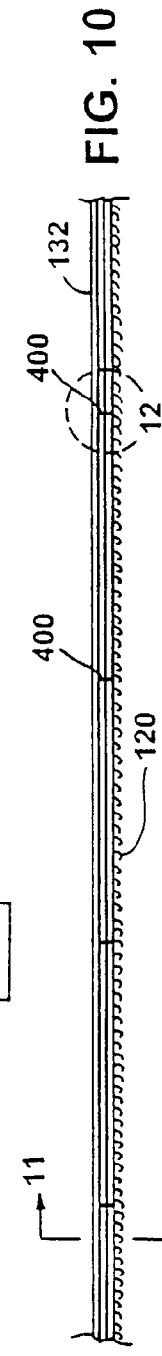
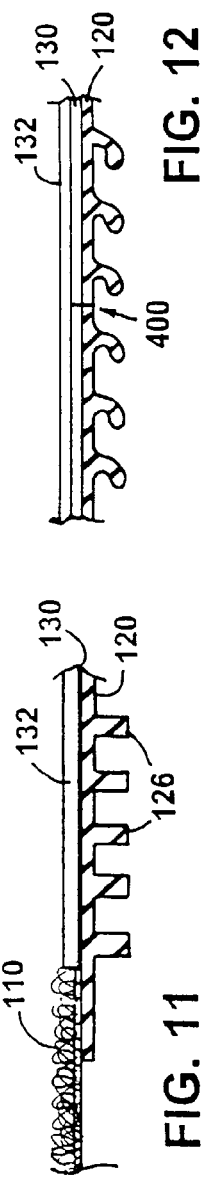

COMPOSITE HOOK AND LOOP FASTENERS, METHODS OF THEIR MANUFACTURE, AND PRODUCTS CONTAINING THEM This application is a continuation of U.S. application Ser. No. 09/818,197, filed Mar. 26, 2001 now U.S. Pat. No. 6,481,063, which was a divisional of U.S. application Ser. No. 09/187,936, filed Nov. 6, 1998, now U.S. Pat. No. 6,205,623.

BACKGROUND

This invention relates to composite hook and loop fasteners, methods of their manufacture and products containing them.

A typical composite hook and loop fastener is produced by taking preformed hook and loop material and overlapping and attaching the two materials together along their edge margins or by totally overlapping one on top of the other. The attaching is usually done by ultrasonic welding, thermal fusing or an adhesive bond. This step of attaching preformed hook and loop material to form the composite fastener adds additional cost to the manufacturing process. Hook and loop materials may also be laminated in-situ during the formation of the hook component.

One particular application for an improved composite fastener, discussed in more detail below, is as a wrap tie for closing bags. An economical bag tie commonly used in retail stores comprises a wire covered with paper. The wire tie is wrapped around an open end of a bag and the ends of the wire are twisted together to close the bag. Another common type of a bag tie is a clip tie that consists of a piece of plastic with an opening. A gathered open end of the bag is pushed through the side of the opening to close the bag. Other closures include strings and tapes and closing arrangements that employ adhesives or removably engageable elements.

The wire ties and clip ties are often used in retail stores where items such as bakery products, fresh produce, dry goods, nails, etc. are placed in a bag and sold by weight or number. The consumer usually stores these products in the bags. The ties may be opened and closed several times before the bag is emptied. There is a need for low-cost dependable repeated-use closures for this and many other applications.

SUMMARY

A composite hook and loop fastener in the form of an elongated strip includes a loop component, a hook component permanently affixed to the loop component, and a backing layer disposed on a face of the wrap tie in a discrete region. The backing layer is used for permanent attachment of the wrap tie to a supporting surface. One end of the loop component is available for encircling an object to be wrapped and engaging the fastener elements of the hook component. The loop component has a self-supporting web of entangled fibers, the fibers forming both a sheet-form body and hook-engageable, free-standing loops extending from at least one surface of the body, and the hook component has fastener elements extending from a common base.

In general, in one aspect, the invention provides a wrap tie in the form of an elongated strip. The wrap tie has an elongated loop component having a web of fibers forming both a sheet-form body and hook-engageable loops extending from at least one surface of the body, a hook component permanently affixed to a first end of the loop component, the hook component comprising a base of synthetic resin and an array of loop-engageable fastener elements integrally molded with and extending from a first surface of the base, and a backing layer permanently affixed to a second surface of the base opposite the fastener elements, for permanent attachment of the wrap tie to a supporting surface. A second end of the loop component is available for encircling an object to be wrapped and engaging the fastener elements of the hook component.

Implementations of this aspect of the invention may include one or more of the following features. The web of the loop component may be non-woven and specifically a needled non-woven. The non-woven needled web may weight less than about 2 ounces per square yard (68 grams per square meter). The non-woven web may be in a stretched, stabilized state. The loops of the loop component may extend from loop structures, and at least some of the loop structures may each have a common, elongated trunk portion extending from the web from an associated knot and multiple loops extending from the trunk portion. The loop component may have an edge margin encapsulated in resin of the hook component, and a remainder free of hook component resin. The edge margin may be about 10% of the area of the loop component. The loop component may have an entire face encapsulated in resin of the hook component. The loop component may have two broad, opposite sides, and loops may extend from both sides. The hook component may be shorter than the loop component, as measured along the wrap tie, and the backing layer may overlap longitudinally the hook component and may be disposed on a side of the wrap tie opposite the fastener elements. The fastener elements of the hook component may be hook- or mushroom-shaped. The hook component may be disposed at one end of the elongated wrap tie, and the hook-shaped fastener elements may extend toward the other end of the wrap tie. The base of the hook component may include an integral extension void of fastener elements, for overlapping the loop component and for face-to-face attachment. The backing layer may be a pressure sensitive adhesive or a synthetic resin. A removable release liner may cover the pressure sensitive adhesive layer. The release liner may overlap longitudinally the loop component such that a portion of the release liner is exposed for grasping.

According to another aspect of the invention, a wrap tie has an elongated hook component having a base of synthetic resin and an array of fastener elements extending from a first surface of the base, a loop component permanently affixed to a first end of the hook component, the loop component having a web of fibers forming both a sheet-form body and hook-engageable loops extending from at least a first surface of the body, and a backing layer permanently affixed to a second surface of the body of loop component for permanent attachment of the wrap tie to a supporting surface. A second end of the hook component is available for encircling an object to be wrapped and engaging the hook-engageable loops of the loop component. The hook component may be in a stretched state.

According to another aspect of the invention, a bag has an open end and an elongated, strip-form wrap tie according to this invention, permanently affixed to an outer surface of the bag for closing the open end. The wrap tie is permanently bonded to the outer surface of the bag in a discrete region along the length of the wrap tie. One end of the loop component is available for encircling the open end of the bag to secure the bag in a closed state. The wrap tie may be permanently affixed to the bag by a pressure sensitive adhesive layer or a synthetic resin. The bag may be made of synthetic resin or paper.

According to another aspect of the invention a sheet-form composite touch fastener includes a loop component having a self-supporting non-woven web of entangled fibers, the fibers forming both a sheet-form web body and hook-engageable free-standing loops extending from at least one surface of the web body, and a hook component having a base of synthetic resin to which loop-engageable hooks are integrally molded. The resin of the hook component extends at least partially underneath the loop component and encapsulates fibers of the web body of the loop component.

Implementations of this aspect of the invention may include one or more of the following features. The loop component may have an edge margin encapsulated in resin of the hook component, and a remainder free of hook component resin. The edge margin may be about 10% of the area of the loop component. The loop component may have an entire face encapsulated in resin of the hook component. The loops of the loop component may extend from a common side of the sheet-form touch fastener. The loops of the loop component may be arranged on a side of the sheet-form composite touch fastener opposite to the hooks of the hook component. The fibers of the loop component may be encapsulated in the resin of the hook component and the loop component may comprise regions which are more encapsulated by resin than other regions.

According to another aspect of the invention a sheet-form composite touch fastener includes a sheet-form loop component having a web of fibers forming both a sheet-form web body and hook-engageable loops extending from at least one surface of the web body and a sheet-form hook component comprising a base of synthetic resin to which loop-engageable hooks are integrally molded. One edge region of the hook component is permanently attached to a first edge of the loop component and fibers of the first edge of the loop component are encapsulated by resin of said edge region of the hook component. The loop component has a second edge, opposite said first edge, substantially free of resin of the hook material.

According to another aspect of the invention a method is provided for manufacturing the elongated, strip-form wrap ties of this invention. The method includes the following steps: Provide a longitudinally continuous sheet of a loop material of finite width, the loop material having loops extending from at least a first surface. Permanently bond a longitudinally continuous strip of plastic hook material to the loop material to form a laminate, with the hook material at least partially overlapping the loop material widthwise and having a width significantly less than the width of the loop material, the hook material having a strip-form base and fastener elements integrally molded with and extending from the strip-form base. Apply pressure sensitive adhesive to a predetermined region of a side of the laminate opposite the fastener elements. Cut the laminate to form the wrap ties, each wrap tie having a portion of the loop material, a portion of the hook material, and a layer of the adhesive.

Implementations of this aspect of the invention may have one or more of the following features. For a wrap tie that has a removable release liner covering the layer of adhesive, the method further includes, before the step of cutting, applying a longitudinally continuous release liner to the laminate to cover the adhesive. The cutting at least perforates the loop material and the base of the hook material to define longitudinal edges of the individual wrap ties, and leaves the release liner longitudinally continuous. The cut wrap ties may be spooled upon the continuous release liner for subsequent separation. The hook material may be bonded to the loop material by ultrasonic welding, thermal welding, or pressure sensitive adhesive. The step of bonding may also include continuously feeding the loop material through a nip defined between a rotating mold roll and a pressure roll, the rotating mold roll defining a multiplicity of fixed cavities about its periphery for molding the fastener elements of the hook material, while continuously introducing molten resin to the mold roll under conditions which cause the resin to fill the cavities of the mold roll and form the hook material, such that pressure in the nip bonds the loop material to the hook material. The molten resin may be introduced to the mold roll in multiple, discrete regions along the roll, thereby forming multiple, parallel strips of hook material laminated to the loop material. After the bonding step and before the cutting step, the laminate is slit longitudinally into multiple, longitudinally continuous bands, each band including both hook material, loop material and adhesive. The loop material may be fed through the nip in the form of multiple parallel strips, while forming the hook material to fill gaps between adjacent strips of hook material in the nip.

According to another aspect of the invention a method is provided for manufacturing the elongated strip-form wrap ties of this invention. The method includes the following steps: Provide a longitudinally continuous sheet of a loop material of finite width, the loop material having loops extending from at least a first surface of the loop material. Provide a longitudinally continuous strip of plastic hook material, the hook material having a width significantly less than the width of the loop material, the hook material having a first surface with fastener elements integrally molded with and extending from the first surface, and a second surface, opposite the first surface, having a layer of pressure sensitive adhesive. Bond the hook material and loop material along their length, with the loop material overlapping a longitudinal edge of the hook material and leaving the layer of adhesive uncovered by loop material. Cut the laminate to form the wrap ties, each wrap tie having a portion of the loop material, a portion of the hook material, and a layer of the adhesive.

According to yet another aspect of the invention a method is provided for manufacturing a sheet-form composite touch fastener. The method includes the following steps: Provide a longitudinally continuous sheet of a loop material of finite width, the loop material having a self-supporting non-woven web of entangled fibers, the fibers forming both a sheet-form web body and hook-engageable free-standing loops extending from at least one surface of the web body, said loop material having a substantially constant fiber density across its width. Permanently bond a longitudinally continuous strip of plastic hook material to the loop material to form a laminate, the hook material having a strip-form base of synthetic resin with fastener elements integrally molded with and extending therefrom and wherein said synthetic resin of the base of the hook component extends at least partially underneath the loop component and encapsulates fibers of said web body of the loop component. Cut the laminate to form the composite touch fasteners, each composite touch fastener having a portion of said loop material, and a portion of said hook material.

According to yet another aspect of the invention an apparatus is provided for manufacturing the elongated, strip-form wrap ties of this invention. The apparatus includes a cooled, rotating forming roll defining a plurality of inwardly extending, fixed fastener element cavities at its periphery; a pressure roll positioned to cooperate with the forming roll to define a nip, the pressure roll having an outer surface for supporting a continuous sheet of a loop material fed into the nip; and an extrusion nozzle positioned to direct a continuous flow of molten resin toward the forming roll under conditions which cause the resin to fill the fastener element cavities and to form a continuous layer of resin against the forming roll, such that the layer of resin is bonded to the loop material by pressure in the nip, to form a laminate. The apparatus further includes an applicator arranged to apply a longitudinally continuous layer of pressure sensitive adhesive, to a discrete region of a side of the laminate opposite the fastener elements; a guide arranged to direct a longitudinally continuous release liner to cover the applied layer of adhesive; and a blade arranged to cut in a transverse direction across the laminate to form individual wrap ties.

According to yet another aspect of the invention a method is provided for releasably securing a container in a closed state. The method includes providing a wrap tie according to this invention; permanently adhering the wrap tie to a surface of the container; wrapping one end of the loop component about the container; and engaging the fastener elements of the hook component with the loops of the loop component to retain the container in a closed state.

Among the advantages of the invention may be one or more of the following. The wrap-tie of this invention does not have any sharp or metal parts, which may cut the bag when they become exposed, pose injury risk for the consumer or oxidize and thus contaminate the bag and its contents. There is no preferred direction or need to twist the wrap tie, thus making it easy to open and close the bag opening. Further the wrap tie of this invention can be pre-attached to a bag automatically or can be dispensed from a wrap tie dispenser for manual attachment to a bag. The very low thickness and stiffness of both the non-woven loop material and the hook material, along with its low cost and good closure performance, make the wrap tie a particularly useful component of many products.

Other features and advantages of the invention will be apparent from the following description of embodiments, and from the claims.

DESCRIPTION OF DRAWINGS

FIG. 6A is a perspective view of a portion of the apparatus of FIG. 5 for forming the preform product of FIG. 7, while

FIG. 8 is a perspective view of four hook and loop segments formed by slitting the web shown in FIG. 7.

FIG. 9 is a top view of a hook and loop segment that has been perforated cut.

FIG. 10 is an enlarged side view of the hook and loop segment, taken along line 10-10 in FIG. 9.

FIG. 11 is a cross sectional view of the interface between the hook and loop segments, taken along line 11-11 in FIG. 10.

FIG. 12 is an enlarged side view of area 12 in FIG. 10.

DETAILED DESCRIPTION

Figure 1:
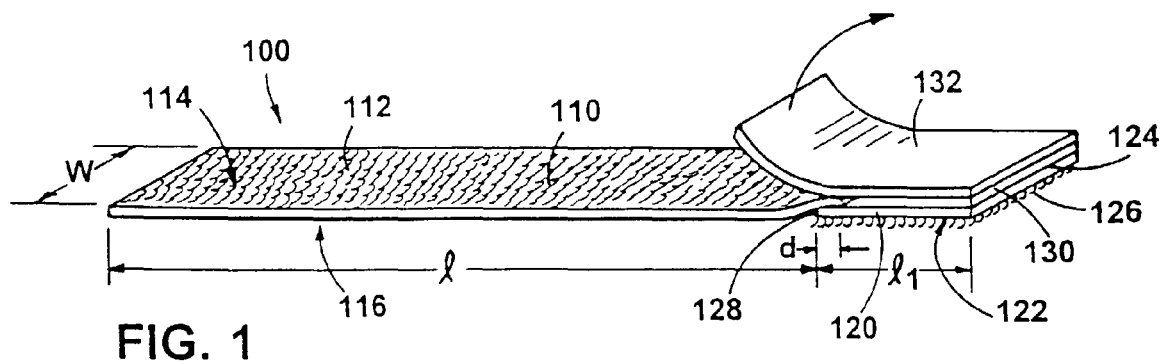
FIG. 1 is a perspective view of a wrap tie having an elongated loop component overlapping an end of a short hook component and adapted for permanent union with a bag or similar article.

Referring to FIG. 1, a wrap tie 100 features an elongated strip of non-woven loop material 110, attached to a short strip of hook material 120.

The strip of non-woven loop material has a first surface 114 with hook-engageable loops 112 and a second relatively smooth surface 116. The strip of hook material 120 has a first surface 122 with integrally molded fastener elements 126 and a second smooth surface 124. The fastener elements may be hook- or mushroom shaped, as illustrated, for example, by hook-shaped fastener element 121 in FIG. 4A and mushroom shaped fastener element 121' in FIG. 4C. The hook-shaped fastener elements extend toward the loop material. The smooth surfaces of the hook and loop strips overlap distance d and are attached at joint 128 so that the loops and hooks extend in opposite directions of the wrap tie. A pressure sensitive adhesive layer 130 covers the shaped fastener element 121 in FIG. 4A and mushroom shaped fastener element 121' in FIG. 4C. The hook-shaped fastener elements extend toward the loop material. The smooth surfaces of the hook and loop strips overlap distance d and are attached at joint 128 so that the loops and hooks extend in opposite directions of the wrap tie. A pressure sensitive adhesive layer 130 covers the remainder of the smooth surface 124 of the hook strip 120. For a face-to-face attachment of the hook and loop strips (FIG. 1F), i.e., attaching the surface of the loop strip having the loops to the surface of the hook strip having the hooks, the base portion of the hook strip 120 has an integral extension 129 without hooks for overlapping the loops of the loop strip 110. The pressure sensitive adhesive layer 130 is covered with a release liner 132, such as silicon coated paper. The release liner 132 overlaps longitudinally the loop component such that a portion of the release liner is exposed for grasping. In one example, the tie is 0.5 inch wide, dimension w, the loop strip is 3 inch long, dimension l, the hook strip is 0.75 inch long, dimension 11, and the overlap area 128 is 0.4 inch long, dimension d, all components having the same width w. The thickness of the loop material may vary between about 0.150 inch and 0.0100 inch, and the thickness of the hook material may vary between about 0.100 inch and 0.010 inch.

Figure 1A:
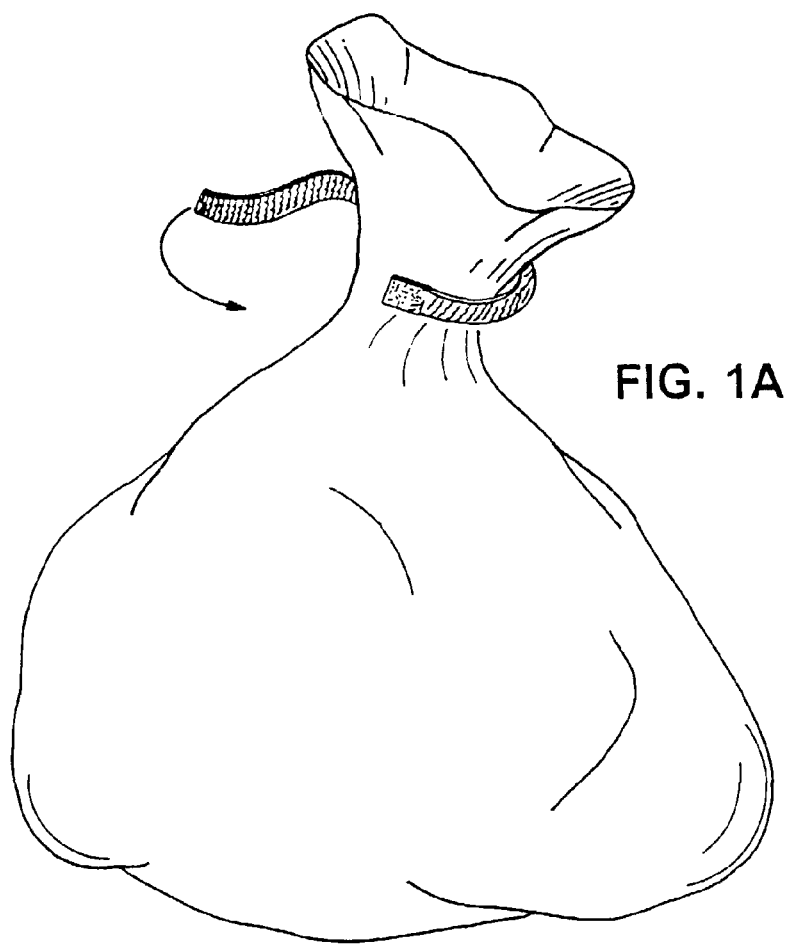
FIG. 1A is a perspective view of a bag having the wrap tie of FIG. 1 attached to its surface.

Referring to FIG. 1A, the wrap tie of FIG. 1 is attached to an open end of a bag by the adhesive layer. The elongated non-woven loop strip is wrapped around the bag opening and the free end of the loop strip is secured to the hook strip by engaging the loops with the hooks. The wrap tie may be prefastened and integrated with the bag, e.g., during manufacture of the bag, or it may be applied to the bag at the time of its use, by removing the release layer and pressing the adhesive component against the material of the bag. The bag may be made of synthetic resin or paper. In some instances the wrap tie may have, instead of the pressure sensitive adhesive layer, a synthetic resin layer which can be thermally fused to the bag surface.

In such applications in which the products are considered disposable after single use, the loop material only need withstand a relatively small number of hooking cycles (e.g., 3 to 5) over the product's useful life. We refer to these as "low cycle" applications. Loop products in this category may be fabricated to advantage with needled fabric that has needle-formed loops on one or both sides. In certain cases, the material is in a permanently stretched and stabilized state, having been stretched to increase its area in excess of 100%, as much as 150% or more from its as-needled condition. A preferred needled and stretched material is formed of staple polyester yarns of between about 18 and 4 denier, preferably 6 denier.

Other applications, such as strapping or bundling, may require the hook-engageable loops to withstand a higher number of cycles and higher stress. These relatively "high cycle", high strength applications generally are preferably achieved by using woven or knitted material or by forming loops with higher denier (or higher tenacity) fibers than those suitable for lower performance conditions. Loop products in this category may be prepared by stretching an appropriate needled loop fabric in the range of 50 percent to 100 percent stretch, for example, followed by stabilization.

For certain applications, specially treated loop material may be used in a wrap tie. For example, on a bag that holds an electronic device and needs to dissipate static electricity, non-woven loop impregnated with carbon or stainless steel may be used. Carbon or stainless steel fibers may also be blended with staple fiber to form a static electricity dissipative non-woven loop material. A two-sided non-woven loop material may be used on a wrap tie that, no matter if twisted, can be fastened to the hook.

Figure 1B:
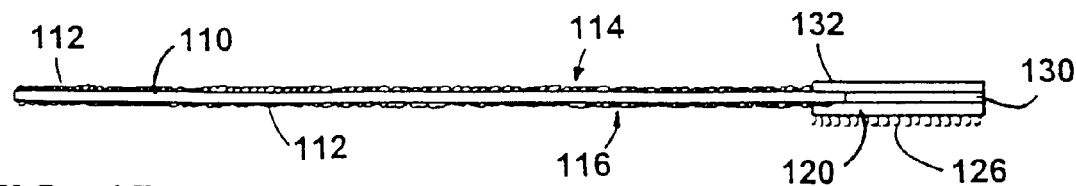
FIG. 1B is a side view of a wrap-tie having loops on both sides of an elongated loop component.
Figure 1C:
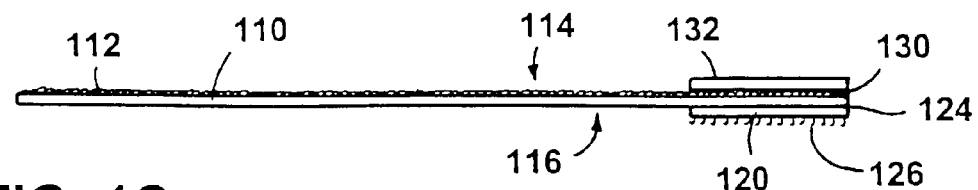
FIG. 1C is a side view similar to FIG. 1B, of a wrap-tie having an elongated loop component, an end portion of which overlaps the entire back surface of a hook component.
Figure 1D:
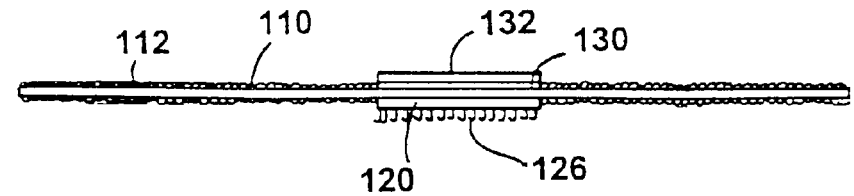
FIG. 1D is a side view of a wrap-tie in which a hook component is attached in the middle of an elongated loop component.
Figure 1E:
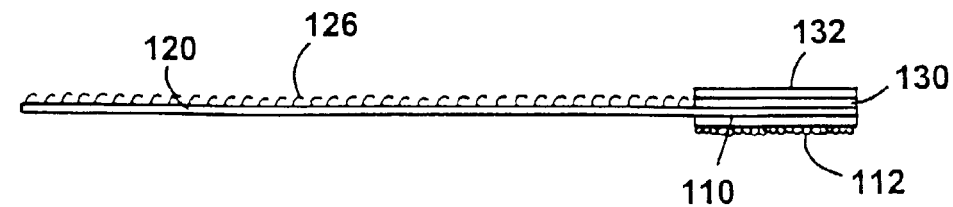
FIG. 1E is a side view of a wrap-tie in which an elongated stretched hook component overlaps an end of a short loop component.
Figure 1F:
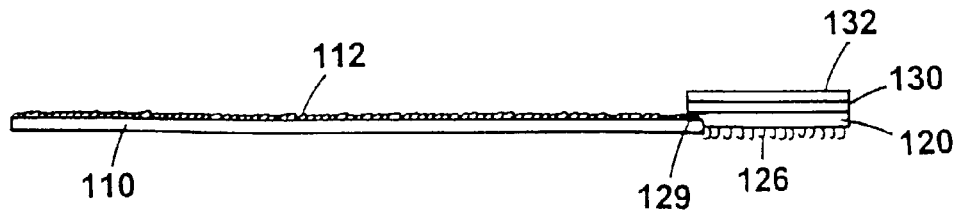
FIG. 1F is a side view of a wrap-tie in which the hook strip is attached face-to-face to the loop strip.

Additional configurations of a wrap tie include among others the following: the loop strip 110 has loops on both surfaces 114 and 116 (FIG. 1B), the loop strip 110 overlaps and attaches to the entire smooth surface 124 of the hook strip 120, with the adhesive layer 130 being intimately bonded to the loop side 114 of the strip(FIG. 1C), the hook strip 120 attaches to the middle of the loop strip 110 (FIG. 1D), and an elongated hook strip 120, which may be of formed and stretched material, is attached to a short loop strip 110 (FIG. 1E).

In preferred embodiments, the non-woven loop material 110 (FIG. 1) is very thin, but still self-supporting, and has relatively free fibers forming loops extending from one side or both sides of a continuous, tangled mat of fibers. In preferred embodiments the non-woven loop material 110 comprises a needled fabric of staple fibers which has been stretched longitudinally and transversely, to form a fabric of the form depicted in FIGS. 2A and 2B.

In such a fabric the individual fibers of the mat follow no definite pattern as in a woven product, but extend in various directions within the plane of the fabric mat. The loops that extend from the loop product are of the same fibers that comprise the mat but extend beyond the general mass of the mat, out of the plane of the mat, generally from associated knots 180, in the form of well anchored loop trees 250 (FIG. 2C).

Figure 2A:
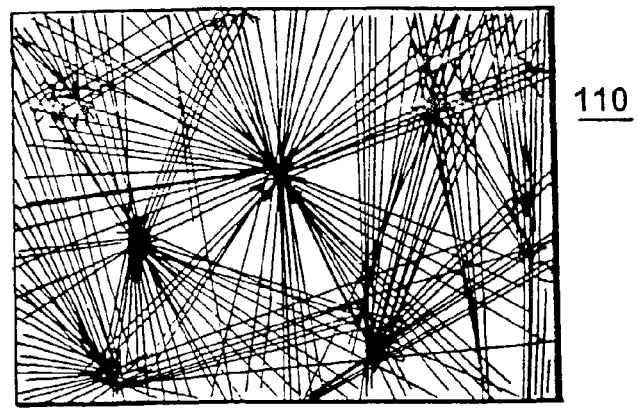
FIG. 2A is a photograph of a preferred non-woven loop material for use as a loop component, enlarged 50×.
Figure 2B:
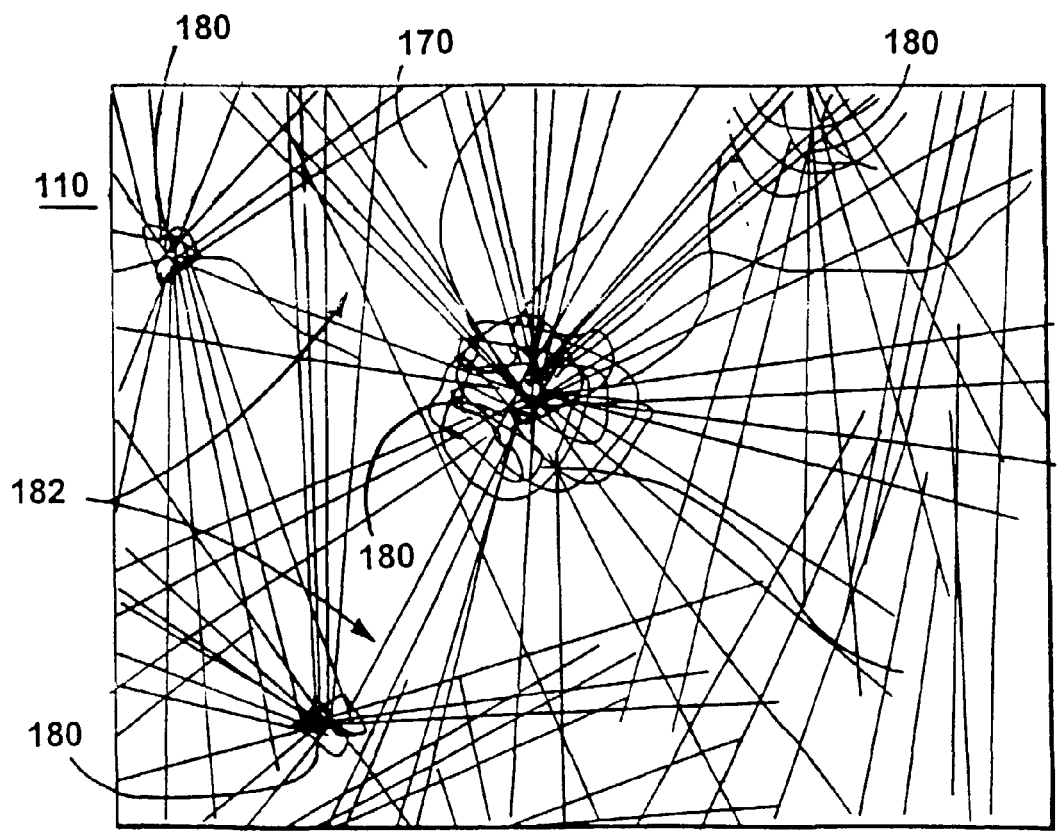
FIG. 2B is a schematic view of the face of the non-woven loop material shown in FIG. 2A.
Figure 2C:
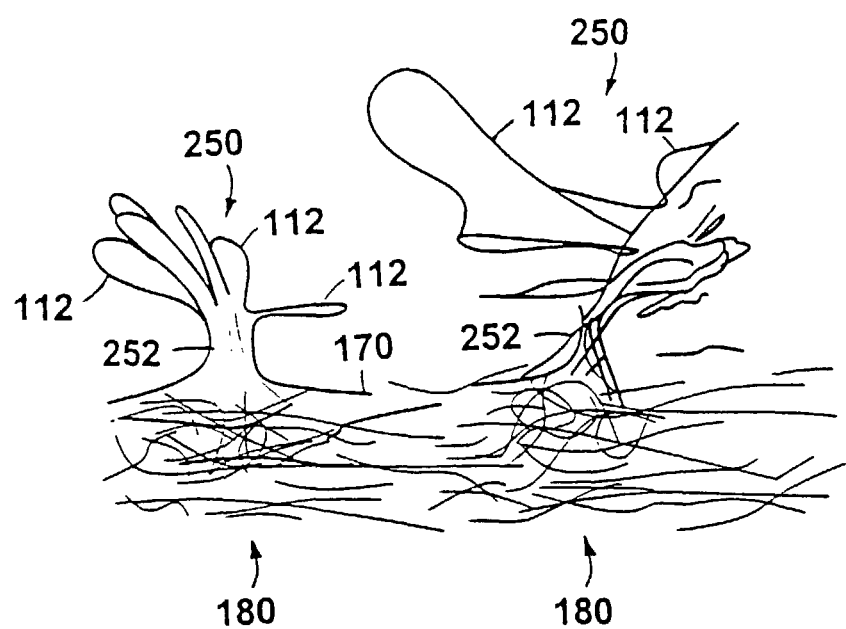
FIG. 2C is a sketch of the non-woven loop material illustrating clusters of loop fibers extending from a fibrous mat.

As shown photographically in FIG. 2A, and in the diagram of FIG. 2B, in relatively low density fiber regions of a preferred mat a substantial number of the fibers of the mat of loop material 110 are taut (i.e., not slack, regionally straight), and extend between knots 180 of the loop material fabric. The taut fibers 182 have been straightened by tension applied in at least one direction in the plane of the fabric mat 170, while the knots have been produced by slippage and agglomeration caused during the application of stretching forces to the needled non-woven fabric.

The knot density of the sample shown in the photograph was determined to be approximately 180 knots per square inch by counting the number of visible knots within a given square area. The knots themselves are fairly tight, made up of several monofilament fibers, and are interconnected by the taut fibers seen running between them. Between knots, the thin fiber mat is not very dense and is sheer enough to permit images to be readily seen through it. For low cost applications, the fabric preferably weighs less than about 2 ounces per square yard (68 grams per square meter).

In this particular embodiment, the fibers of the mat are held in their taut, straightened condition by a water-based, acrylic binder (not visible in the photograph) applied to the side of the mat opposite the loops to bind the mat fibers in their straight condition to stabilize the areal dimensions of the fabric, and to secure the loops at their associated knots. The binder generally ranges between 20 and 40% of the total weight of the fabric and in the presently preferred embodiments accounts for about one third of the total weight of the loop component. The resulting fabric is dimensionally stable and strong enough to be suitable for further processing by standard fabric-handling techniques. While the fabric has a slight stiffness, like a starched felt, the stiffness can be mitigated where desired by softeners or mechanical working.

As seen in FIG. 2C, loops 112 extend from free-standing clusters of loop fibers extending from the fibrous mat 170. The clusters 250 which have several mono-filament loops 112 extending from a common elongated, substantially vertical trunk 252 we call "loop trees". Each loop tree 250 extends from a corresponding knot 180 in which the loops of the cluster are anchored. Interstices between individual filaments in the trunk portion 252 of each tree or at the base of each bush, and in each knot 180 provide paths for the wicking of liquid binder, under the influence of surface tension of the liquid binder, to provide additional localized stiffness and strength. Importantly, the density of clusters in the plan view is very low, leaving sufficient room between the "branches" of neighboring trees to accommodate hooks and deflected loop material during engagement.

A more complete description of suitable non-woven loop materials may be found in U.S. Pat. No. 6,342,285, and a related pending PCT patent application entitled "Loop material, its manufacture and its use in products", Publication No. WO99/11452, filed on Sep. 3, 1998, as a continuation in part of the foregoing U.S. Patent, the entire disclosures of which are hereby incorporated by reference.

Figure 3:
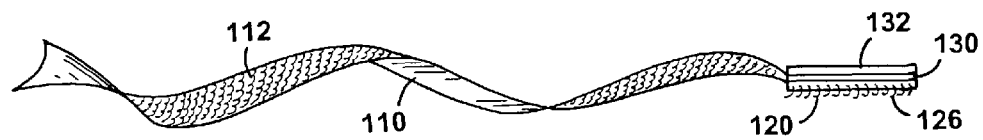
FIG. 3 is a side view of a twisted wrap tie according to the invention.

Referring to FIG. 3, the flexibility of the non-woven material 110 allows it to be twisted several times and fastened on the hook fastener strip 120. Even if there are loops on only one face of the strip, hook engageable loops occur at all quadrants of the twist, to ensure engagement with the hook component. Further the loops around the slit edges of the loop strip are oriented in line with the fibrous mat 170, making the edges hook engageable.

Figure 4A:
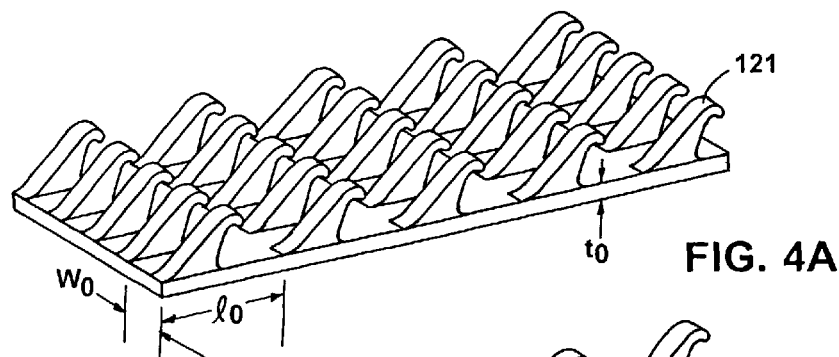
FIGS. 4A and 4B are perspective magnified views of portions of a hook fastener and a stretched hook fastener, respectively.
Figure 4B:
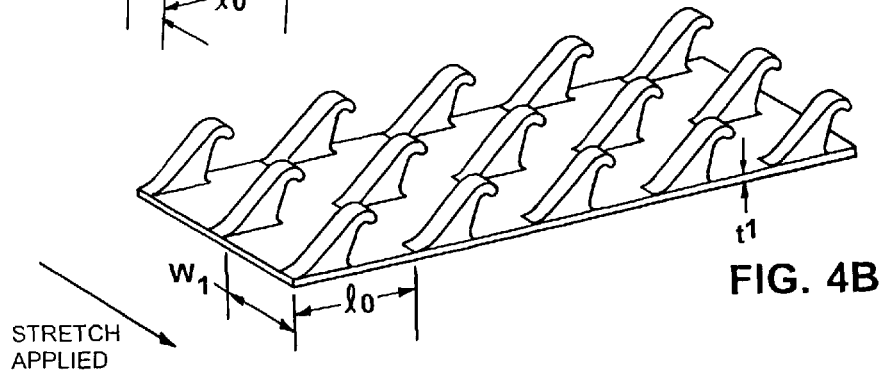
Figure 4C:
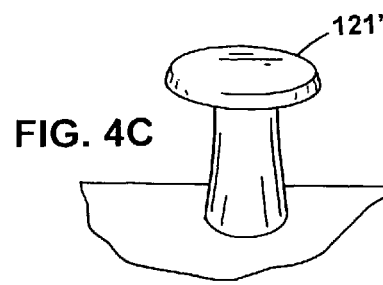
FIG. 4C is a perspective, magnified view of a mushroom-shaped fastener element.

A hook strip 120 compatible with the loop material is used. For a non-woven loop material made from staple polyester fibers having a denier of 6, a hook may be of the CFM-29 designation, available from Velcro USA Inc. of Manchester, N.H., U.S.A. The CFM-29 hook strip has hooks of only 0.015 inch (0.38 mm) height. Especially when the hook component is the elongated component as depicted in FIG. 1E, the hook strip may be a stretched hook product. Referring to FIGS. 4A and 4B, when a hook product is subjected to lateral stretching, the material of the base web 150 decreases in thickness, from the original thickness to of FIG. 4A to the reduced thickness $t_1$, of FIG. 4B. The areal density of the fastener elements is accordingly reduced. For example, with hook form elements of a type having a conventional height of about 0.035 inch and a spacing $l_o$ of about 0.050 inch along the rows, starting with a spacing $w_o$, of the rows of about 0.025 inch and ending with a spacing $w_1$ of FIG. 4B of about 0.100 inch, the areal density changes by a factor of 4, from about 800 fastener elements 11 per square inch to about 200 fastener elements per square inch. Starting with higher hook densities, higher final densities can be achieved to match the hooking needs of particular applications, while still of low cost.

Figure 5:
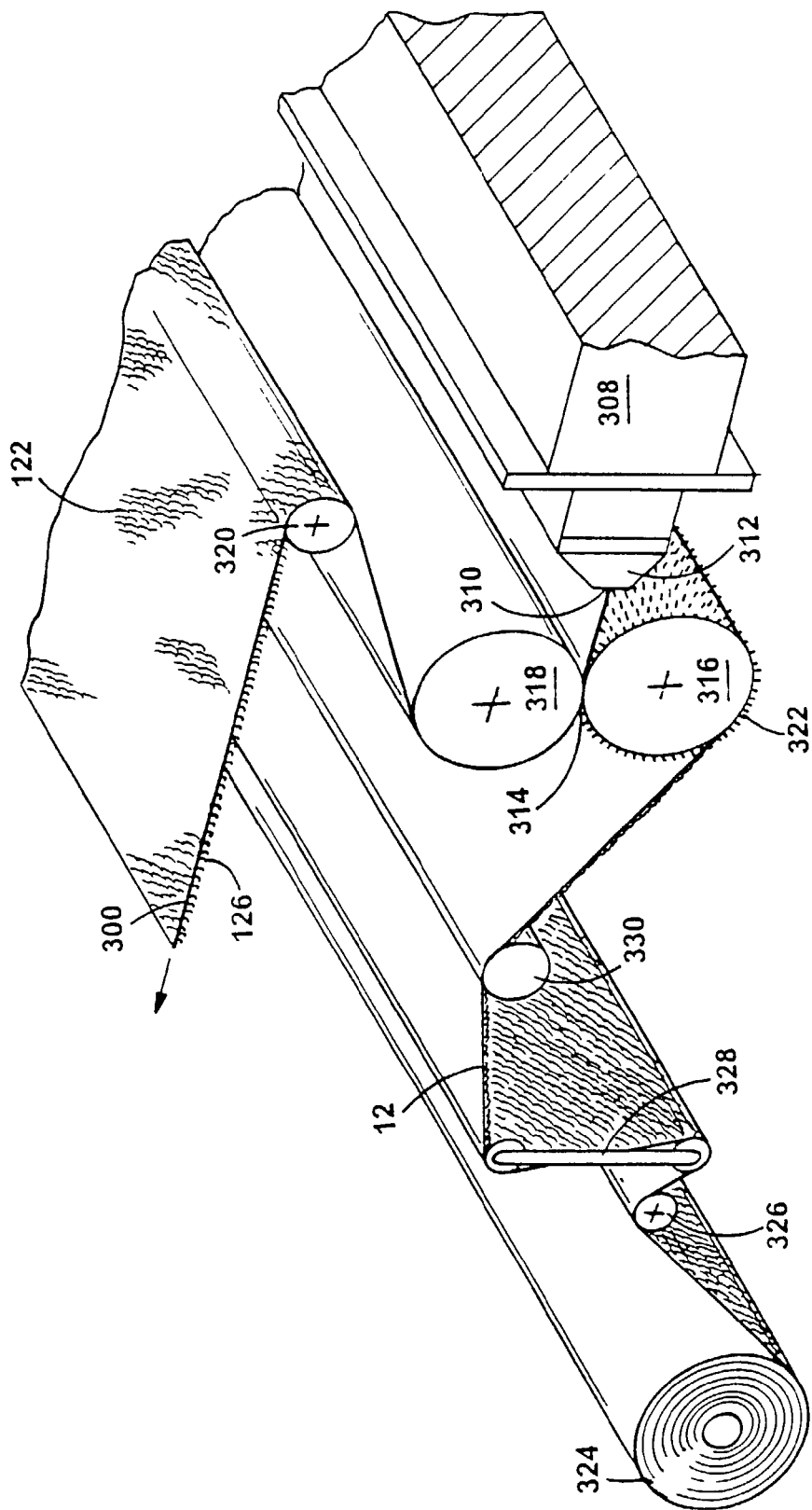
FIG. 5 illustrates an apparatus for forming and uniting components of a wrap tie.

The product of FIG. 1 may be economically formed by the process and apparatus illustrated in FIG. 5. Extruder barrel 308 melts and forces the molten plastic 310 through a slot-form die 312. The extruded plastic enters the nip 314 between base roll 316 and mold roll 318 containing mold cavities shaped to form the hooks of a strip-form hook fastener component of the well known hook and loop type. The strip fastener material formed in nip 314 travels about the periphery of mold roll 318 to stripping roll 320, which assists in pulling the finished product 300 from the mold roll, and from there to a windup device, not shown.

For more detail about the general operation of the apparatus of FIG. 5, the reader is referred to U.S. Pat. No. 5,260,015 to Kennedy, et al., which discloses laminates made with loop materials.

Figure 6A:
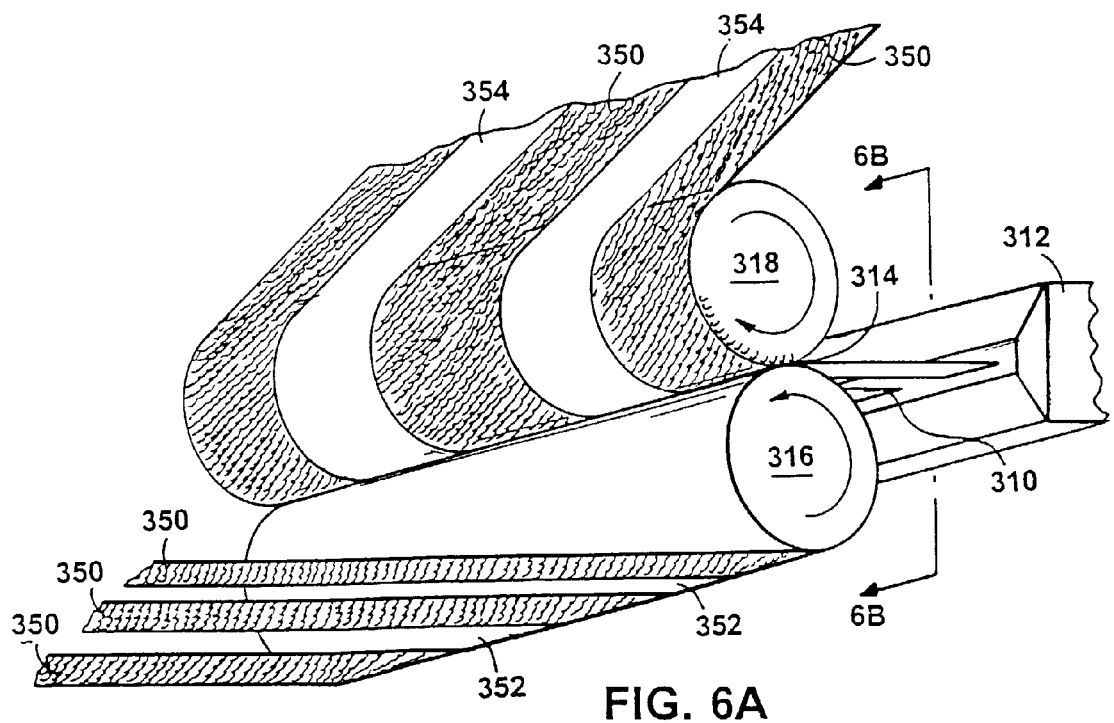
Figure 6B:
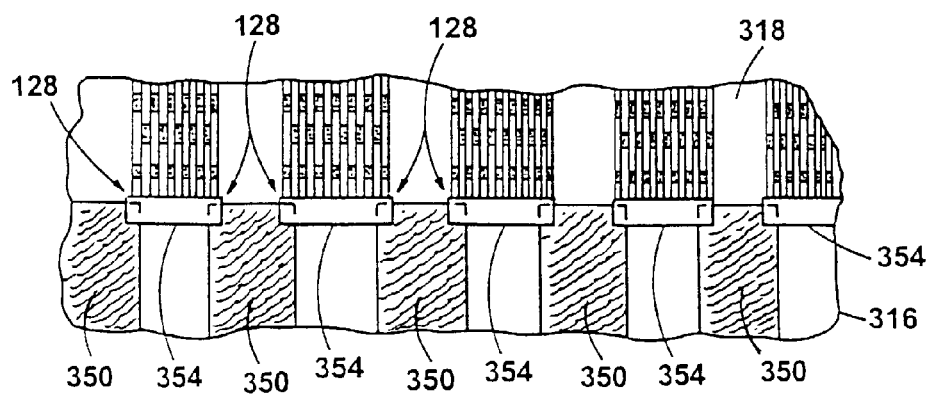
FIG. 6B is a view taken in plane 6B-6B of FIG. 6A.

There are many possible methods of feeding the non-woven sheet material to the forming section of the hook forming device. In one example, shown in FIGS. 6A and 6B, several transversely spaced apart bands of non-woven material 350 are introduced about the periphery of the base roll 316 and enter nip 314 at the same time molten plastic 310 enters the nip at regions between the bands of loop material. The slot-form die has alternating plugs and open die spaces, the spaces arranged to provide molten resin that fills the spaces 352 between the bands of the non-woven loop material and produce limited overlap of the resin and the bands of non-woven 35 (FIG. 6B), for forming joints 128. The edge margins of the bands of non-woven material bond intimately with the edge margins of the molten resin with which bands of hook fasteners 354 are integrally formed. The bond is formed by encapsulating fibers of the loop material with the molten resin of the hook material. Thereby a composite structure of joined alternating bands of loop component and hook component are formed.

Figure 7:
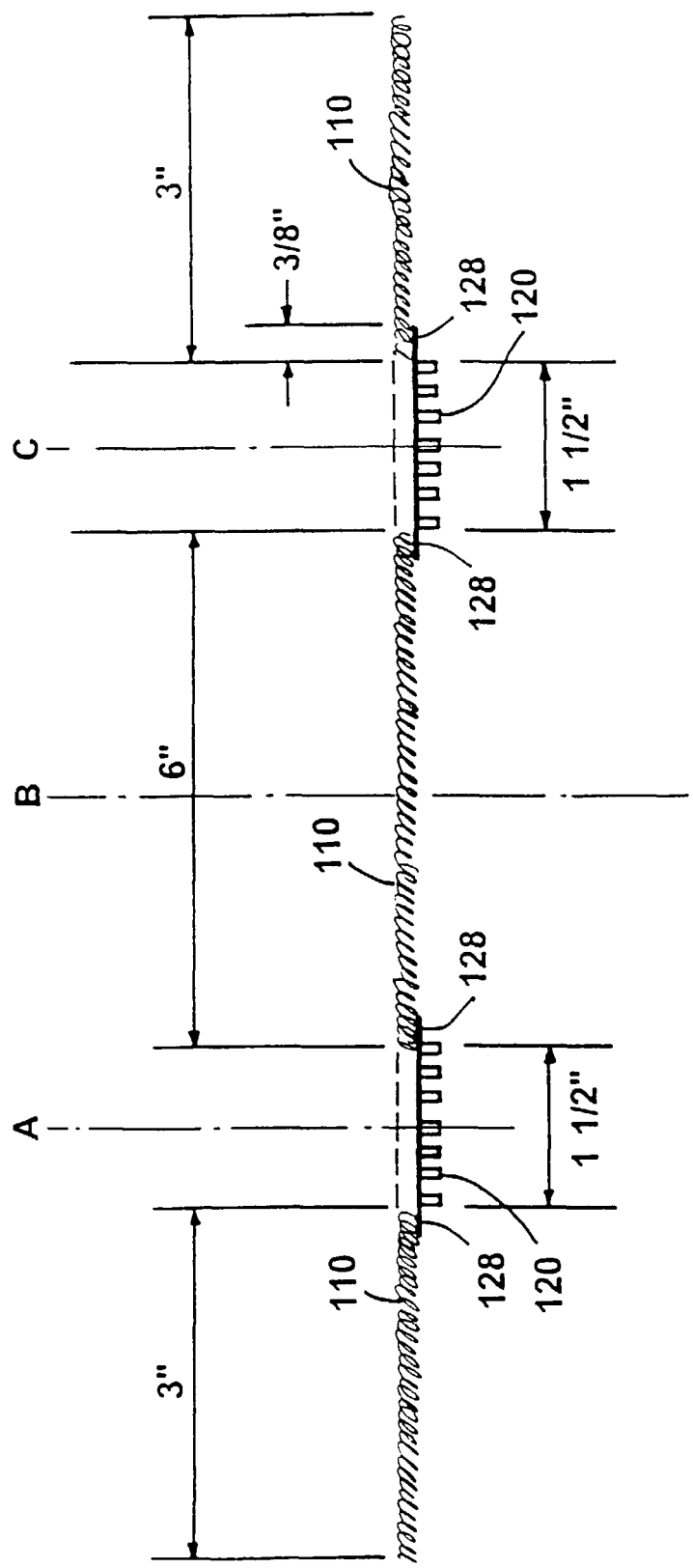
FIG. 7 illustrates a web comprised of attached loop and hook bands formed with the apparatus of FIGS. 5, 6A and 6B.

In one example, a web includes (FIG. 7), starting from the left, a 3 inch wide strip of non-woven loop, an inch and a half wide strip of hook material, a 6 inch wide strip of non-woven loop, an inch and a half wide strip of hook material and a 3 inch wide strip of non-woven loop. The alternating strips of non-woven and hook material overlap partially, being bonded at joints 128. The overlap areas are for instance 0.4 inch wide. After formation, the web passes through a slitter where it is longitudinally slit at the mid-points A and C of the hook segments, and at the midpoint B of the 6 inch loop segment. This results in four continuous length composite webs, each comprising a narrow band of hook material joined to a relatively wide band of non-woven loop material (FIG. 8).

In the next step each of the four webs passes through a coating line where a pressure-sensitive adhesive is applied to the back of the hook strip material, this followed by a step where a release liner is placed on the adhesive layer.

At that point each of the four continuous webs is perforated-cut (kiss-cut) along lines 400 through the loop and hook side but not through the release liner 132, as shown in FIGS. 9, 10, and 12, to form a series of elongated bag ties. The direction of the kiss-cut 400 is perpendicular to the longitudinal axis 402 of the composite web, which coincides with the machine direction. A cross section of the web along the indicated direction 11-11 is shown in FIG. 11.

Figure 13:
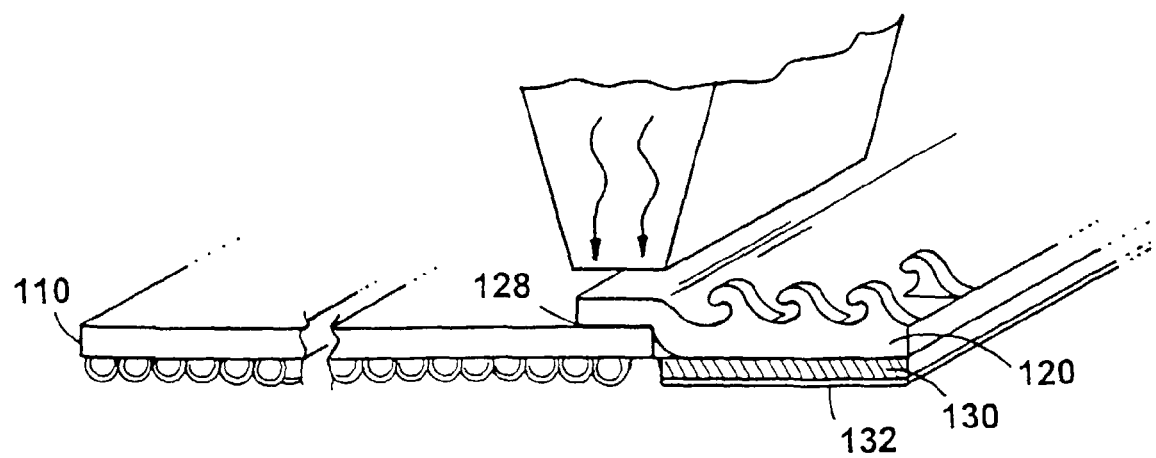
FIG. 13 illustrates reciprocating ultrasonic welding of bands of hook and loop material to form a wrap tie preform.
Figure 13A:
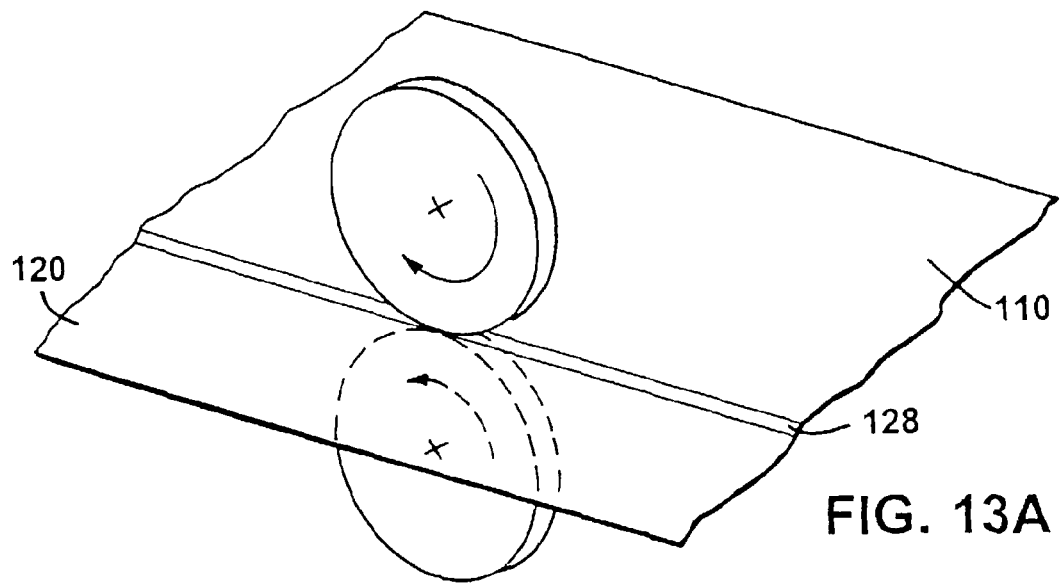
FIG. 13A illustrates rotary ultrasonic welding of bands of hook and loop material to form a wrap tie preform.

An alternative way to manufacture the wrap tie is to ultrasonically seal respective preformed bands of hook and loop material. The two materials are slit to the appropriate width and their edges overlapped and ultrasonically welded with a reciprocating ultrasonic welder, as shown in FIG. 13, or a rotary ultrasonic welder, as shown in FIG. 13A. The back of the hook material is coated with pressure-sensitive adhesive prior to welding.

Figure 14:
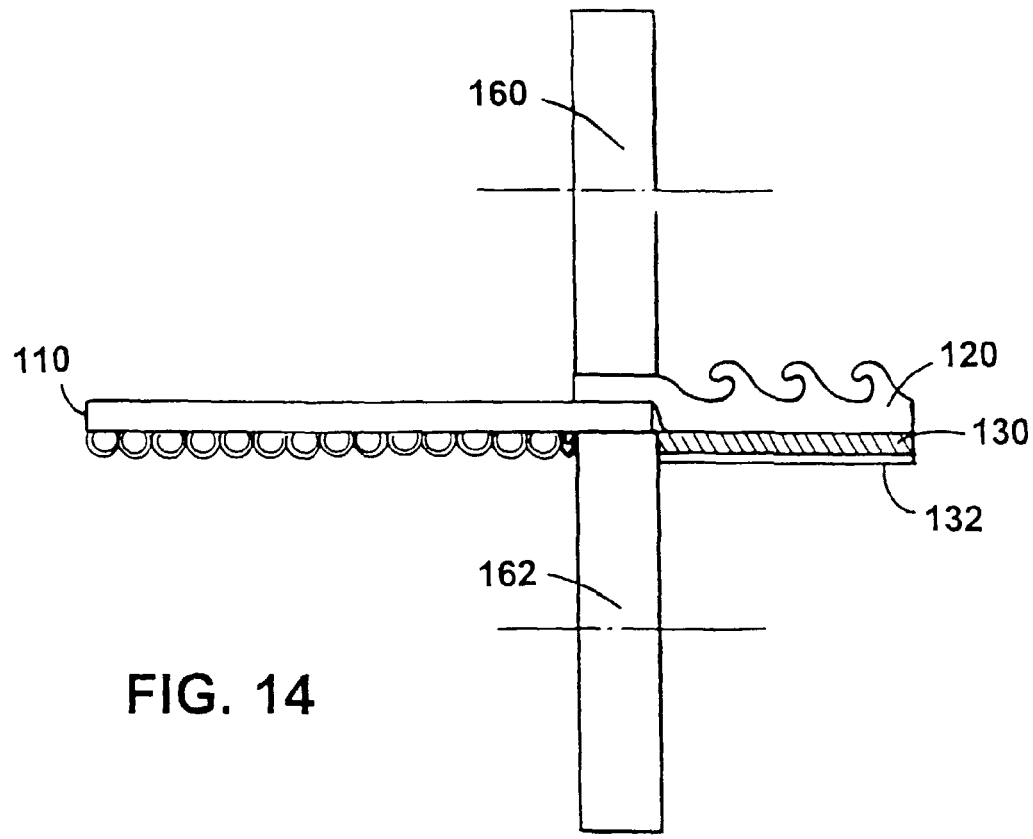
FIG. 14 illustrates thermal fusing of bands of hook material and loop material to form a wrap tie preform.

Another way to manufacture the wrap tie is to thermally fuse overlapping edge margins of preformed bands of hook and loop materials. Thermal fusing is performed with two rotary wheels 160 and 162, shown in FIG. 14. Both rotary wheels are heated, and may have a knurl pattern on them. The wheels come in contact and nip the area to be joined, which in this case is the overlap area between the edges of the loop and hook bands. The heated wheels melt the hook resin and fuse it into and around the fibers of the non-woven loop, thereby forming a bond between the margin portions of the two bands. The mechanical surrounding of the fiber with the melted, then solidified resin provides the necessary bond strength.

Different type of resins may be used to form either the hook or the non-woven material. In certain preferred cases, as mentioned, the non-woven material is made from polyester fibers and the hook material from polyethylene.

The hook and loop material preferably differ in their heat properties. For example, the polyethylene melts at a lower temperature than the polyester and thereby allows the thermal fusing of the hook resin around the polyester fiber of the loop material, to form a strong mechanical bond with dimensional stability.

The adhesive for layer 130 is preferably a pressure sensitive type adhesive. In some instances, layer 130 may be a synthetic resin suitable for thermal fusion onto a substrate.

Figure 15:
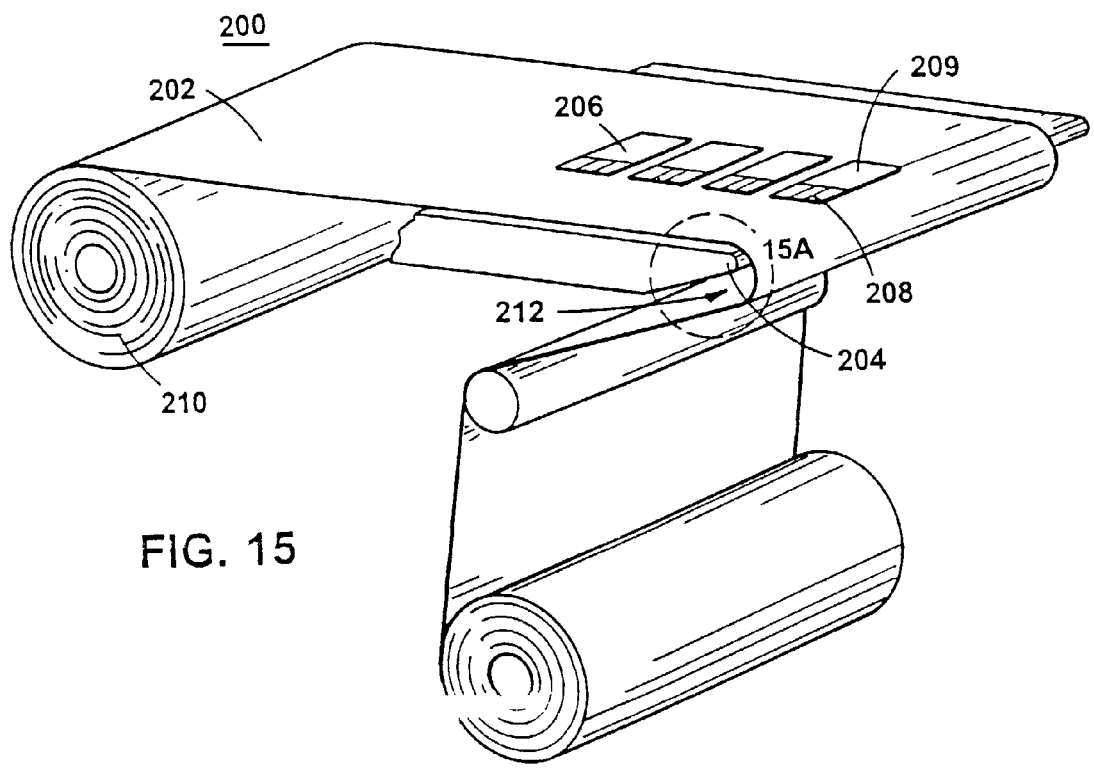
FIG. 15 is a schematic illustration of an apparatus that dispenses wrap ties from a carrier sheet.
Figure 15A:
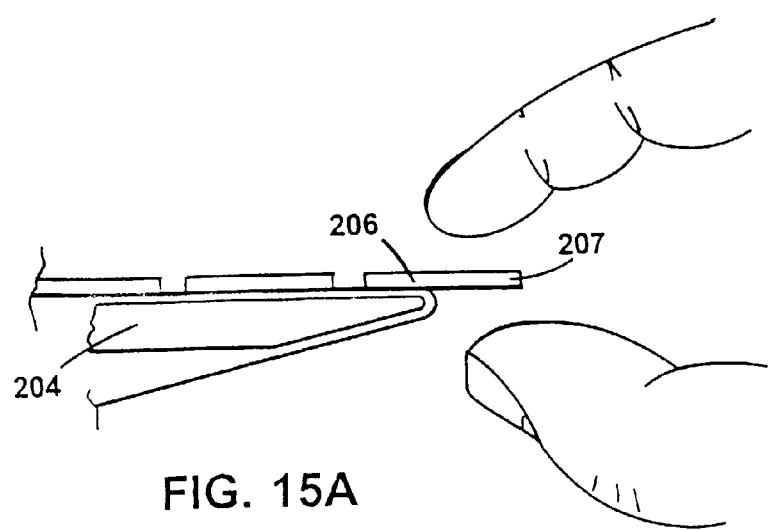
FIG. 15A is a schematic illustration of area A in FIG. 15.
Figure 15B:
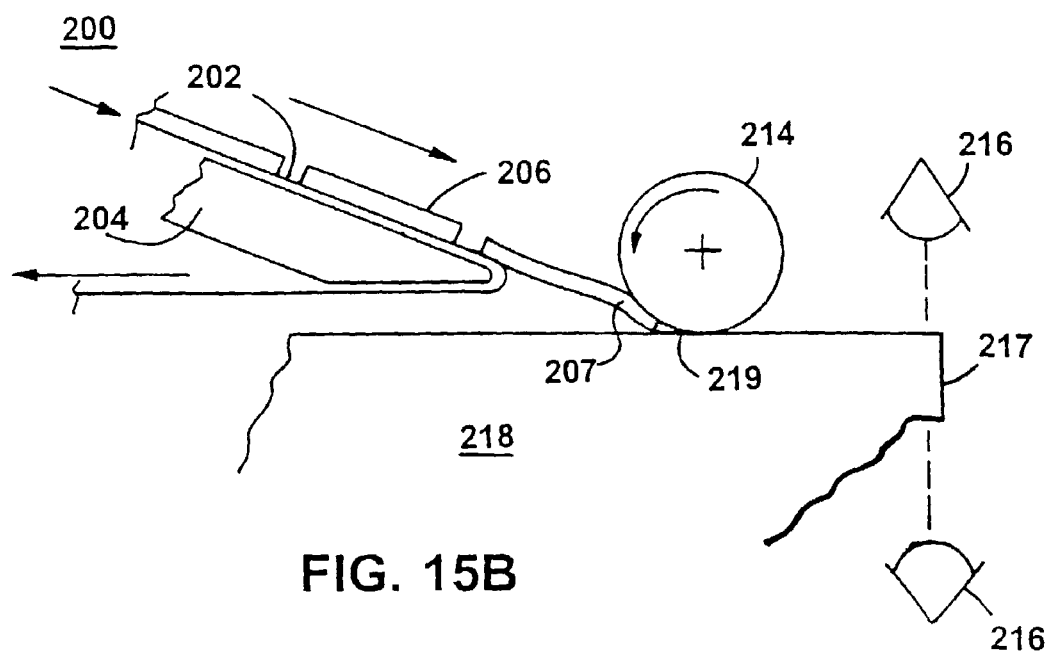
FIG. 15B is a schematic illustration of an automatic label dispensing apparatus.

Wrap ties carried by a common release liner 202 may be rolled into a roll 210. The wrap ties 206 have one end 208 attached to the release liner with the pressure sensitive adhesive and a free end 209. The roll 210 may be fed to a standard labeler 200, shown diagrammatically in FIG. 15. The release liner is arranged to pass under a sharp angle 212 around a peel plate 204, where it reverses direction. The release liner is flexible and can change easily direction. However, the wrap tie has a certain amount of stiffness that causes the edge of the wrap tie 207 not to follow the release liner 202 around the peel plate 204, and to protrude at the point where the release liner reverses its direction (FIG. 15A). In this way the peel plate automatically separates the wrap tie from the release liner. The wrap tie may either be indexed or dynamically placed upon a moving bag on a bagging machine which produces polyethylene bags. Automatic label dispensing on a moving bag is shown in FIG. 15B. The leading edge 217 of the moving bag 218 trips an electric eye 216. The electric eye may be a light emitting diode. The electric eye 216 sends a signal to the label dispenser 200 and the dispenser accelerates and transports the wrap tie 206 towards the moving bag 218. When the wrap tie 206 reaches a predetermined location 219 on the bag 218 and while the wrap tie is still connected to the release liner 202 a tamp roller 214 presses edge 207 of the wrap tie 206 onto the bag 218. The wrap tie 206, the bag 218, and the release liner 202 continue to move at the same speed, while the tamp roller 214 presses the wrap tie onto the bag. Once the wrap tie is fully released from the release liner and attached to the bag, the release liner stops moving while the bag continues to move away from the dispenser region. The process repeats again when the next bag moves close to the dispenser area and trips the electric eye 216. The advancement of the wrap ties may be controlled by a separate sensor (not shown) for increased accuracy.

When the backing layer 130 is made of synthetic resin, the tamp roller 214 is heated to thermally fuse the wrap tie onto the bag.

Figure 16A:
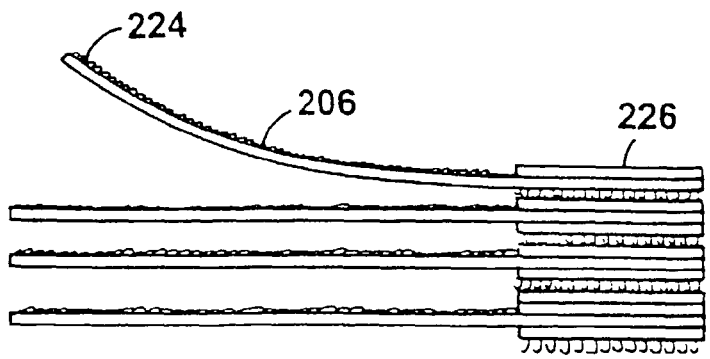
FIG. 16A is a side view of stacked wrap ties.
Figure 16B:
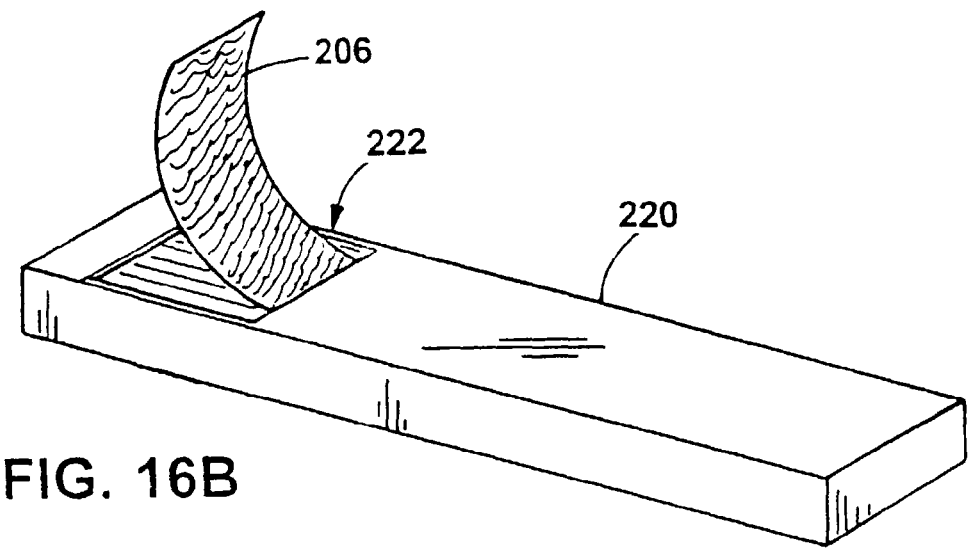
FIG. 16B is a schematic illustration of a box dispenser for the stacked wrap ties of FIG. 16A.
Figure 17:
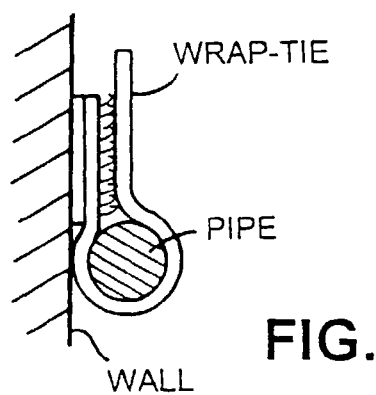
FIG. 17 is a schematic illustration of an application of a wrap tie as a support of a pipe against a wall.

In another embodiment, the wrap ties 206 may be stacked one on top of the other (FIG. 16A), having one end 226 of each tie releasably adhered together and a free end 224. The stacked wrap ties may be placed in a dispenser box 220 (FIG. 16B). The dispenser box has an opening 222, allowing the free ends 224 of the wrap ties to be successively pulled out of the box.

Other features and advantages of this invention may include one or more of the following. The web in FIG. 7 may be first coated with the pressure sensitive adhesive and then pass through the slitter where it is longitudinally slit to form the hook and loop segments. The very low thickness of both the non-woven loop material and the hook material, along with its low cost and good closure performance, make the wrap tie a particularly useful component of many products. The wrap ties may be employed, for instance, to close a plastic bag as described above (FIG. 1A), to secure pipes or other building materials (FIG. 18), to bundle cables and secure bundled cables, etc.

Other features and advantages of the invention will be realized, and are within the scope of the following claims.

What is claimed is:

1. A method of manufacturing sheet-form composite touch fasteners, the method comprising the steps of:
    providing a longitudinally continuous sheet of a loop material comprising a non-woven web of entangled fibers, the fibers forming both a sheet-form web body having oppositely directed faces and hook-engageable loops extending from at least one face of the web body;
    introducing the loop material and molten resin to a gap adjacent a mold roll, the molten resin being introduced to the gap in discrete regions between the mold roll and a receiving face of the continuous sheet of loop material, such that the resin is subjected to pressure between the mold roll and the loop material, forcing the resin into cavities defined in the mold roll to form a laminate with a surface having spaced-apart resin-covered regions and exposed regions of the loop material, the resin-covered regions each having a resin base and multiple, loop-engageable fastener elements having stems integrally molded with and extending from the resin base in the direction in which the receiving face is directed, resin of the bases encapsulating fibers of said web body at the receiving face of the loop material in the resin-covered regions, thereby bonding the resin to the loop material; and then
    cutting the laminate to form said composite touch fasteners, each composite touch fastener having a surface comprising at least a portion of one of the exposed regions of the loop material, and at least a portion of one of the resin-covered regions.

2. The method of claim 1, wherein molten resin is introduced to the gap in multiple, spaced-apart bands.

3. The method of claim 1, wherein the gap is in the form of a nip defined between the mold roll and a counter-rotating pressure roll.

4. The method of claim 1, wherein the laminate is cut across both loop material and one or more resin bases, such that the composite touch fastener formed comprises both loops and at least a portion of one or more resin-covered regions.

5. A method of manufacturing a composite material having fastener loops and loop-engageable fastener elements, the method comprising:
    providing at least one longitudinally continuous flexible material having oppositely directed faces, the flexible material having fastener loops extending from at least one of its faces,
    introducing molten resin to a plurality of spaced-apart, discrete regions of a resin-receiving face of the flexible material while leaving free of resin other regions of the resin-receiving face of the flexible material, at least some fastener loops of the flexible material on one or both faces of the flexible material remaining free of resin and positioned to be engaged by loop-engageable fastener elements; and
    forming the resin to provide both a resin base portion joined to the resin-receiving face of the flexible material and resin loop-engageable fastener elements having resin stems integrally formed with and extending outwardly from an outer surface of the resin base portion, the stems extending in the same direction as the direction faced by the resin-receiving face of the flexible material.

6. The method of claim 5 in which the flexible material is of the same construction where the molten resin is introduced and where the fastener loops free of resin are positioned.

7. The method of claim 5 in which the flexible material is selected from the group consisting of nonwoven, knit and woven sheet material.

8. The method of claim 5 in which the resin-receiving face of the flexible material is comprised of fibers, resin of the base portion encapsulating fibers at the resin-receiving face of the flexible material to bond the resin to the flexible material.

9. The method of claim 5 employing a rotating roll having an outer surface constructed to form the outer surface of the resin base portion, the outer surface of the roll having forming cavities constructed to form the stems of the fastener elements integrally with and extending outwardly from the surface of the base portion.

10. The method of claim 9 in which the rotating roll is a mold roll that is paired with a counter-rotating second roll to form a nip, and in which the sheet material is introduced into the nip with the resin-receiving face of the flexible material directed toward the mold roll and with the molten resin located between the mold roll and the resin-receiving face of the flexible material.

11. The method of claim 10 in which multiple, spaced-apart continuous bands of molten resin of limited transverse dimension enter the nip with the flexible material and are formed into base portions joined to the flexible material and stems integral with and extending outwardly from the outer surfaces of the respective base portions.

12. The method of claim 9 in which the roll is a mold roll having mold cavities constructed with outer and inner mold cavity portions, the outer mold cavity portions shaped to form the stems integral with the outer surfaces of the base portion and the inner mold cavity portions shaped to form loop-engageable features on the outer ends of the stems.

13. The method of claim 5 including so selecting the flexible material, so conducting the method of forming the composite, and so cutting the resulting composite, as to provide a fastener product capable of being wrapped about one or more objects and secured by engagement of loop-engageable fastener elements with fastener loops of the product.

14. The method of claim 13 including applying adhesive to a selected region of the composite for attaching the fastener product to an article.

15. The method of claim 5 in which the spaced-apart regions comprise continuous bands.

16. The method of claim 15 in which the multiple, spaced apart regions of loop engageable fastener elements are separated by separate bands of flexible material.

17. The method of claim 5 in which a distribution of the loop-engageable fastener elements is produced that is narrower than a region of the resin-receiving face that is substantially free of the resin.

18. The method of claim 5 in which the face of the flexible material opposite to the resin-receiving face is entirely covered with engageable fastener loops.

19. The method of claim 5 in which the resin-receiving face of the flexible material bears both engageable fastener loops and loop-engageable fastener elements.

20. The method of claim 5 in which the loop-engageable fastener elements are formed as loop-engageable fastener hooks having crook-form tips.

21. The method of claim 5 in which the loop-engageable fastener elements are formed as loop-engageable mushrooms.

* * * * *